(12) United States Patent
Weber et al.

(10) Patent No.: US 12,126,241 B2
(45) Date of Patent: Oct. 22, 2024

(54) BRUSH HOLDER FOR HOLDING AT LEAST TWO BRUSHES FOR A SLIDING CONTACT ARRANGEMENT, ELECTRICAL MACHINE AND MOTOR VEHICLE

(71) Applicant: AUDI AG, Ingolstadt (DE)

(72) Inventors: Andreas Weber, Ingolstadt (DE); Philipp Uhlmann, Ingolstadt (DE); Andreas Ruf, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/895,798

(22) Filed: Aug. 25, 2022

(65) Prior Publication Data
US 2023/0065349 A1    Mar. 2, 2023

(30) Foreign Application Priority Data
Aug. 26, 2021   (DE) .......................... 102021122065.3

(51) Int. Cl.
| | |
|---|---|
| *H02K 5/14* | (2006.01) |
| *H01R 39/38* | (2006.01) |
| *H02K 9/19* | (2006.01) |
| *H02K 9/28* | (2006.01) |
| *B60L 50/60* | (2019.01) |

(52) U.S. Cl.
CPC .......... *H02K 5/148* (2013.01); *H01R 39/385* (2013.01); *H02K 9/19* (2013.01); *H02K 9/28* (2013.01); *B60L 50/60* (2019.02)

(58) Field of Classification Search
CPC ............ H02K 5/148; H02K 9/28; H02K 9/19; H02K 5/141; H01R 5/383; H01R 5/385; H01R 39/383; H01R 39/385; B60L 50/60
USPC ........................................................... 310/54
See application file for complete search history.

(56) References Cited

U.S. PATENT DOCUMENTS

| | | | |
|---|---|---|---|
| 9,985,401 B2* | 5/2018 | Hirabayashi ......... | H01R 39/381 |
| 10,177,623 B2* | 1/2019 | Hirabayashi ........... | H01R 43/00 |
| 2009/0096315 A1* | 4/2009 | Mantle ................. | H01R 39/381 |
| | | | 310/239 |
| 2010/0289360 A1* | 11/2010 | Grabner ................ | H02K 5/148 |
| | | | 310/239 |
| 2013/0147310 A1 | 6/2013 | Zadeh | |
| 2019/0140521 A1* | 5/2019 | Deuke ...................... | H02K 9/28 |

FOREIGN PATENT DOCUMENTS

| | | |
|---|---|---|
| DE | 6936266 U | 7/1971 |
| DE | 102007059555 A1 | 6/2009 |
| DE | 102019104980 A1 | 8/2019 |
| JP | 2015159655 A | 9/2015 |
| JP | 2017017940 A | 1/2017 |
| WO | 2010010270 A2 | 1/2010 |

* cited by examiner

*Primary Examiner* — Alex W Mok
(74) *Attorney, Agent, or Firm* — Seed IP Law Group LLP

(57) ABSTRACT

A brush holder for holding at least two brushes for a sliding contact arrangement, including an intermediate element and two contact elements for electrically contacting at least one of the brushes, the contact elements being arranged on two opposite sides of the intermediate element and the intermediate element having a receptacle extending through the opposite sides for a rotating shaft.

17 Claims, 5 Drawing Sheets

BRUSH HOLDER FOR HOLDING AT LEAST TWO BRUSHES FOR A SLIDING CONTACT ARRANGEMENT, ELECTRICAL MACHINE AND MOTOR VEHICLE

BACKGROUND

Technical Field

Embodiments of the invention relate to a brush holder for holding at least two brushes for a sliding contact arrangement, comprising an intermediate element and two contact elements for electrically contacting at least one of the brushes in each case. Furthermore, embodiments of the invention relate to an electrical machine and a motor vehicle.

Description of the Related Art

Sliding contact arrangements are used, for example, in externally excited electrical machines, in which they are used to make electrical contact with the rotor windings. For this purpose, an electrical circuit is formed, for example with two or more brushes, via which the rotor winding can be energized to generate the excitation field. In this case, contact areas such as contact rings or the like, which are located on the rotating shaft, are contacted via the brushes. For this purpose, the brushes are usually arranged in a stationary manner in the immediate vicinity of the rotating shaft and are held in direct contact with the contact areas. A brush holder can be used for this purpose, to which the brushes can be attached. Various types of sliding contact arrangements are known from the prior art.

JP 2017017940 A describes a sliding contact arrangement in which the brushes engage on the outer circumference of a contact ring. In this case, a cooling medium can be applied to the contact surface between the brush and the contact ring and which can flow off towards the interior of a rotating shaft having the contact ring. For this purpose, through holes are provided in the circumference of the shaft, the brush being sucked onto the contact surface of the sliding contact arrangement by the outflowing coolant.

A sliding contact arrangement is known from US 2013/0147310 A1, which comprises a cavity filled with a liquid metal. Contact between a stationary and a rotating part of the slip ring arrangement is made possible via the liquid metal.

JP 2015159655 A discloses a slip ring contact arrangement comprising a cooling device arranged inside the shaft. The slip rings are contacted via a plurality of brushes which are offset along the axial direction of the shaft.

BRIEF SUMMARY

Some embodiments provide an improved brush holder for holding at least two brushes for a sliding contact arrangement, which in particular has a compact design.

Some embodiments provide a brush holder of the type mentioned at the outset to have the contact elements arranged on two opposite sides of the intermediate element and the intermediate element has a receptacle for a rotating shaft that extends through the opposite sides.

The intermediate element is in particular electrically insulating, so that the contact elements arranged on the two opposite sides of the intermediate element are electrically isolated. Thus, the at least one brush can be contacted on one of the sides via the contact elements. An electrical circuit, for example for energizing an excitation winding of an externally excited electrical machine, can thus be formed via the two brushes or via the two contact elements. The brushes can in particular be carbon brushes.

The intermediate element has a receptacle extending between the opposite sides. A rotating shaft can be arranged in this receptacle, so that in particular two slip rings of the shaft arranged offset in the axial direction of the shaft can be contacted by the brushes arranged on opposite sides of the intermediate element and connected to the contact elements.

The receptacle makes it possible for the brush holder to be arranged very close to a rotating shaft. Furthermore, the arrangement of the two contact elements on the opposite sides of the intermediate element enables a compact structure of the brush holder. In particular, an arrangement of the brush holder on or in an electrical machine is made easier because a space-saving arrangement of the brushes in the immediate vicinity of the shaft is made possible.

Furthermore, the counterparts to the brushes, which are embodied, for example, as contact rings on a rotating shaft, can also be designed to save space and, in particular, require as little space as possible in the axial direction of the shaft. As a result, the shaft can also be designed to save space. This also has an advantageous effect on an electrical machine, which can also be designed to be compact and space-saving.

The intermediate element can be designed, for example, as an electrically insulating plastic part, in particular as a one-piece part, which can be produced, for example, in an injection molding process. The contact elements are electrically conductive and are made of metal, for example. The contact elements may each be designed as a sheet metal part, so that the brush holder can be manufactured easily.

It can be provided that the receptacle is designed as a through hole or a recess of the intermediate element. In the case of a receptacle designed as a through hole, the intermediate element completely surrounds the shaft in a plane orthogonal to the axis of rotation of the shaft or orthogonal to the axial extent of the shaft. Alternatively, it is possible for the receptacle to be in the form of a recess, so that the intermediate element only partially surrounds the shaft. Depending on the design of the receptacle of the intermediate element, the intermediate element thus extends around the entire shaft or it only partially surrounds the shaft. An intermediate element with a recess designed as a notch can have a horseshoe shape or a C-shape, for example. An intermediate element with a receptacle designed as a through hole can be ring-shaped or annular disk-shaped.

In some embodiments, it can be provided that the intermediate element and/or the contact elements are in the form of an annular disk. An annular disk-shaped intermediate element can in particular have a receptacle for a rotating shaft, which is designed as a through hole. The use of annular disk-shaped contact elements makes it possible to arrange one or more brushes on each of the opposite sides of the intermediate element and to contact them electrically via the contact element. The use of annular disk-shaped contact elements enables, in particular, simple electrical contacting of a plurality of brushes, which are arranged offset around the entire circumference of a rotating shaft.

In order to make contact with the brushes through the contact elements, it can be provided that the contact elements each delimit at least one receiving section with the intermediate element for receiving one of the brushes. The receiving sections can in particular be designed in such a way that in each case a carbon brush which is in particular substantially cuboid can be received in them. The contact elements can abut directly on the intermediate element, at least in sections, with the receiving sections being formed by areas of the contact elements that protrude from the intermediate element and, for example, delimit a rectangular area with the intermediate element. A brush can thus be arranged in each case between the intermediate element and the respective contact element in these receiving sections. The brushes can be fixed to the brush holder in the axial direction of a shaft received in the receptacle by the receptacle sections.

It can be provided that the areas of the sides of the intermediate element that delimit the receiving sections each have a rib structure. A brush arranged in the receiving area can thus abut on the rib structure of the intermediate element. The rib structure enables a smaller contact surface, which makes it easier, for example, for the brushes to move or press against a contact ring of the shaft. Furthermore, the rib structure also enables an air flow to develop between the brush and the intermediate element, for example due to the brush heating up. The brush can heat up, for example, during operation of the sliding contact arrangement when an electrical current is passed through the brushes. Furthermore, due to the friction of the brushes on the respective counterparts of the sliding contact, the brushes can also heat up.

In some embodiments, it can be provided that the contact elements each have at least one contact section which protrudes laterally beyond the intermediate element. The contact sections can protrude outwards beyond the intermediate element, in particular in the radial direction of a rotating shaft arranged in the receptacle or in the radial direction of a substantially circular receptacle. Electrical lines, for example, can be attached to the contact sections, via which the contact elements and thus also the brushes can be energized. For example, the contact section may each be substantially rectangular. It is possible for one or both contact sections to have one or more openings in which, for example, an electrically conductive pin or the like can be inserted, for example to simplify connection of the contact section to a pole piece of an electrical line.

It can be provided that the contact elements have an identical geometry. This makes it possible to manufacture the contact elements for both sides of the intermediate element in an identical manner, so that the number of different parts that are required to manufacture the brush holder can be reduced. Due to the use of identical parts for the contact elements, the complexity of the structure of the brush holder and consequently also the production of the brush holder can be significantly simplified.

In order to improve heat dissipation from the brush holder, it can be provided that the intermediate element has at least one cooling duct extending inside the intermediate element. The cooling duct can be connected, for example, to a cooling circuit or a cooling medium can be applied to it, so that heat can be dissipated from the interior of the intermediate element. In addition or as an alternative, the cooling duct can also serve to supply a coolant to the brushes and/or other components of a sliding contact arrangement in order to cool them, in particular, during operation of the sliding contact arrangement.

For this purpose, it can be provided that the intermediate element has at least one outlet opening of the cooling duct on at least one of the opposite sides. In particular, the intermediate element has at least one outlet opening of the cooling duct on each of the two opposite sides. In particular, an outlet opening of the intermediate element is not covered by the contact element arranged on the same side, so that the cooling liquid can exit from the outlet opening. The outlet openings allow a cooling liquid to be applied to a rotating shaft, in particular in the area of the sliding contacts.

It can be provided that the outlet opening is designed as a drip opening or a nozzle. A coolant, in particular a liquid coolant, for example an electrically insulating cooling oil, can be applied to a rotating shaft in the region of the sliding contacts through a drip opening. As the brushes are in contact with contact rings on the shaft, the coolant can be pushed over the surface of the shaft when the shaft is rotating, so that electrical contact between a brush and a ring contact is not impaired. The oil that hits the shaft can then flow off the shaft, dissipating heat from the brushes and/or the rotating shaft.

It is also possible that the drip opening is designed as a nozzle, whereby a jet of a liquid or gaseous coolant can be generated through the nozzle, which is directed onto the brush and/or the shaft, in particular onto the contact rings of the shaft, which can be arranged in direct contact with the brushes. Heat can also be dissipated from the brushes and/or the shaft by spraying a liquid or gaseous coolant onto the sliding contact arrangement.

In addition to the outlet openings, the intermediate element can also have one or more inlet openings, via which the cooling duct extending inside the intermediate element can be connected to a cooling device. A liquid or gaseous cooling medium can flow into the cooling duct via the inlet opening or can be supplied or injected in compressed form.

In some embodiments, it can be provided that the brush holder comprises at least one pressing means, wherein, via the pressing means, a force, in particular a force directed in the direction of the center of the shaft arranged in the receptacle, can be applied to a brush arranged on the brush holder. The force can be directed, for example, in the direction of a center of a receptacle designed as a circular through hole. Even in the case of a receptacle designed as a notch, the force can be directed towards a center of the notch or towards the center of a rotating shaft arranged in the receptacle, so that the brushes can be pushed inward in the radial direction of the shaft, if possible, against the outer circumference of the shaft or against the contact rings arranged there.

The pressing means can be designed, for example, as a spiral spring, by means of which the force can be applied to the brush. The spiral spring can be attached to the contact element and/or to the intermediate element. For example, the spiral spring can be arranged around a projection of the contact element, with an outer circumference of the spiral spring being held together at least in areas by a receiving section of the intermediate element which is, in particular, delimited by an axial projection of the intermediate element. In this way, a compact arrangement of the spiral spring on the brush holder and a simple structure of the brush holder are made possible.

It can be provided that the intermediate element has at least one pin protruding from the respective side on the opposite sides in each case, which extends through a corresponding through hole in the adjacent contact element, the contact elements being attached to the intermediate element by reshaping the pin. The intermediate element can be made of a plastic, for example, and can have at least one pin protruding from the side on the opposite sides.

When mounting the brush holder, the contact element to be mounted on the respective side can then be arranged on the intermediate element, with the pin being passed through a corresponding through hole of the contact element. The pin can then be reshaped, for example by heating the pin or the like, so that it is widened after passing through the through hole of the contact element and thus enables stable attachment of the contact element to the intermediate element. In particular, several pins can be provided for attachment, which each extend through a corresponding through hole of the contact element in each case.

It is provided for an electrical machine as described herein that it comprises at least one brush holder as described herein. The electrical machine can furthermore have, in particular, a rotating shaft which is arranged in the receptacle of the intermediate element of the brush holder. The rotating shaft can in particular have at least two contact rings arranged offset in the axial direction of the shaft, with at least one contact ring in each case being in direct contact with the brushes which are arranged or can be arranged on one side of the brush holder. In this case, an axis of rotation of the shaft can run at least substantially perpendicularly to the opposite sides of the intermediate element on which the contact elements are arranged. The electrical machine can have an externally excited rotor, which can be energized via the brush holder.

It can be provided that the brush holder is arranged in a wet space of the electrical machine that is at least partially filled with an insulating coolant. The arrangement of the brush holder in a wet space of the electrical machine has the advantage that no additional seal is required between a space in which the brush holder is arranged and a wet space of the electrical machine that is at least partially filled with a coolant. Sealing of the rotating shaft can thus be dispensed with, as a result of which fewer friction losses occur, particularly in the case of a high-speed rotor shaft. The electrically insulating coolant in the wet space can be applied to active parts of the rotor and/or the stator, in particular by oil spray cooling.

It can be provided that the intermediate element of the brush holder has at least one cooling duct extending inside the intermediate element, with the intermediate element abutting at least in areas on a housing component, in particular a bearing plate, of the electrical machine and a coolant can be supplied to the cooling duct via a cooling duct of the housing component. The cooling duct of the housing component can in particular have an outlet opening which is directly opposite an inlet opening of the intermediate element arranged on the housing component, so that the cooling duct of the housing component and the cooling duct in the intermediate element are connected to one another. In this way, a coolant, in particular a cooling liquid, can be supplied from the cooling duct in the housing component to the cooling duct in the interior of the intermediate element. A coolant supply to the cooling duct extending in the interior of the intermediate element can thereby be implemented in a space-saving manner.

As described above, the coolant supplied to the cooling duct in the intermediate element can be supplied to the brushes and/or the shaft-side contact rings via the outlet opening of the intermediate element. The cooling oil flowing off the sliding contact arrangement can be collected in a cooling oil sump of the electrical machine and can be removed from there again for cooling the sliding contact arrangement and/or other components of the electrical machine.

It can be provided that the housing component is arranged between a rotor of the electrical machine and the brush holder, wherein cooling liquid, spun against the guide structure upon rotation of the rotor, can be supplied to the cooling duct of the housing component as coolant via at least one guide structure. The housing component can in particular be a bearing plate, which bears the rotating shaft against a stationary housing of the electrical machine. In this case, the rotor of the electrical machine can be arranged on one side of the housing component or the bearing plate. The brush holder can be arranged opposite the bearing plate, so that a guide structure can be arranged in the vicinity of the rotor.

This guide structure communicates in particular with the cooling duct of the housing component, so that when the rotor rotates, cooling liquid that is thrown around and collides with the guide structure can run off the latter and flow off through the cooling duct of the housing component. The cooling liquid flowing off via the cooling duct of the housing component is thus guided to the cooling duct inside the intermediate element of the brush holder. From there it can finally reach the shaft through the outlet openings of the cooling duct in the area of the sliding contacts.

It is provided for a motor vehicle as described herein that it comprises at least one electrical machine as described herein. The electrical machine can in particular be a traction electric motor of the motor vehicle.

All the advantages and configurations described above in relation to the brush holder apply correspondingly to the electrical machine, and vice versa. The advantages and configurations described for the brush holder and the electrical machine also apply to the motor vehicle, and vice versa.

BRIEF DESCRIPTION OF THE SEVERAL VIEWS OF THE DRAWINGS

Further advantages and details result from the embodiments described below and from the drawings. These are schematic representations.

DETAILED DESCRIPTION

Figure 1:
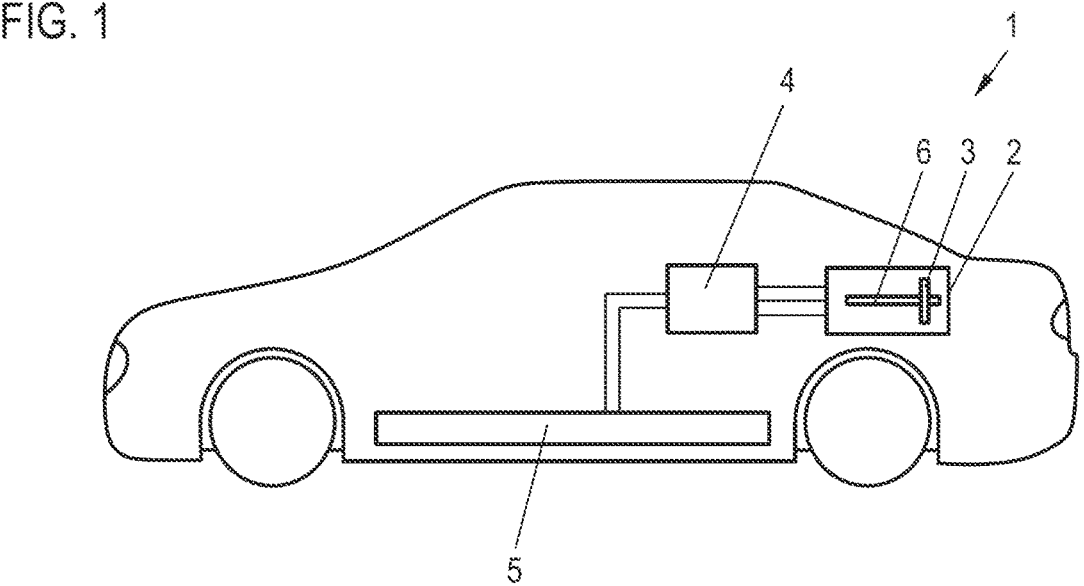
FIG. 1 shows an embodiment of a motor vehicle.

FIG. 1 depicts an embodiment of a motor vehicle 1. The motor vehicle 1 comprises an embodiment of an electrical machine 2. The electrical machine 2 comprises an embodiment of a brush holder 3.

The electrical machine 2 is a traction electric motor of the motor vehicle 1. This motor is connected to a traction energy store 5 of the motor vehicle 1 via power electronics 4. The traction energy store 5 can be a high-voltage battery, for example, which provides direct current. The direct current can be transformed into a multi-phase, in particular three-phase, alternating current for operating the electrical machine 2 by the power electronics 4 designed in particular as a bidirectional inverter. Conversely, generator operation of the electrical machine 2 is also possible, in which an alternating current generated by the electrical machine is transformed into a direct current by the power electronics 4 and fed into the energy store 5.

The electrical machine 2 is an externally excited machine, in particular the electrical machine 2 is an externally excited synchronous machine. The electrical machine 2 comprises a rotating shaft 6 which forms a sliding contact arrangement with the brush holder 3. Rotor coils (not shown) arranged on the rotor can be energized via the sliding contact arrangement in order to enable motor operation or generator operation of the electrical machine 2.

Figure 2:
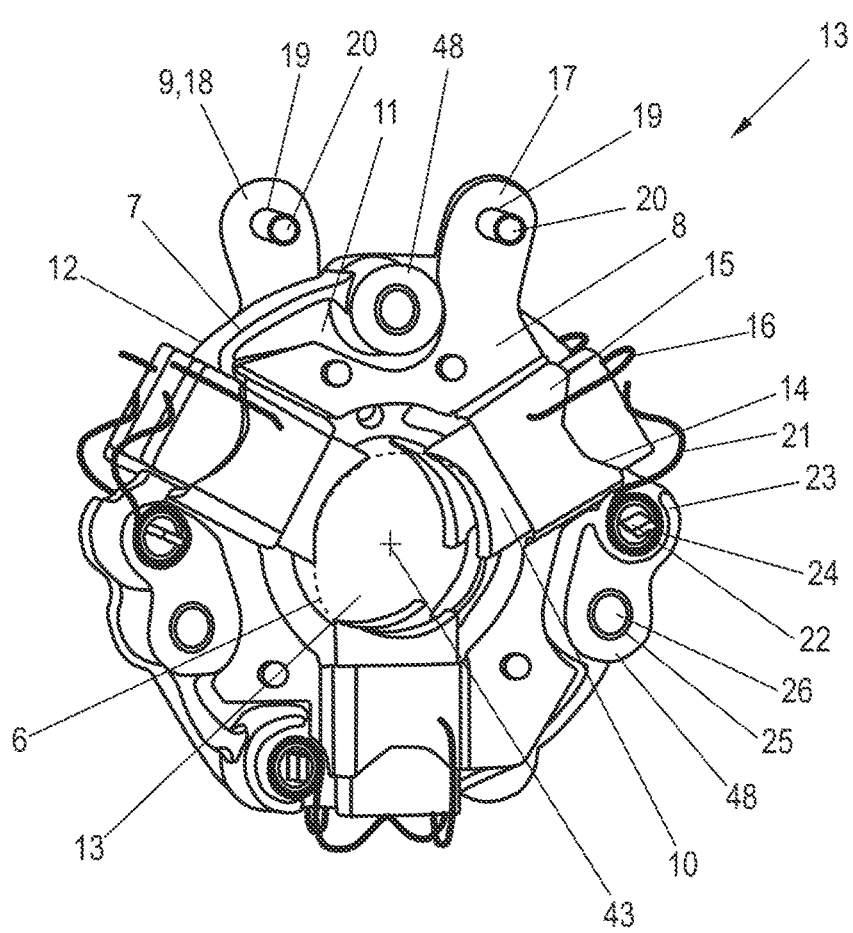
FIG. 2 shows a first embodiment of a brush holder.

FIG. 2 depicts an embodiment of the brush holder 3. The brush holder 3 comprises an intermediate element 7 and two contact elements 8, 9. The contact elements 8, 9 are used for making electrical contact with at least one brush 10 in each case. In the present case, the contact elements 8, 9 are each used for contacting three brushes 10.

The contact elements 8, 9 consist, for example, of sheet metal and are electrically conductive. The intermediate element 7 is electrically insulating and is made of plastic, for example. The intermediate element 7 can be produced, for example, in an injection molding process, in particular in one piece in a single tool. The brushes 10 are designed as carbon brushes and have an at least substantially rectangular shape, wherein the side surface of the brushes facing the shaft 6 can have a concave curvature which can be adapted in particular to the radius of the contact rings of the shaft 6.

The contact elements 8, 9 are arranged on two opposite sides 11, 12 of the intermediate element 7. The intermediate element 7 also comprises a receptacle 13 in which the rotating shaft 6 of the electrical machine 2 can be received. The first contact element 8 is arranged on a first side 11 of the intermediate element 7. Correspondingly, the second contact element 9 is arranged on a second side 12 of the intermediate element 7. The geometry of the contact element 9 and the arrangement of the brushes 10 on the second side 12 of the intermediate element 7 is identical in this case to the geometry of the contact element 8 and the arrangement of the contact element 8 and the brushes 10 on the first side shown in plan view of the first side 11 of the intermediate element 7.

A current can be supplied to a first ring contact on the shaft 6 by the brushes 10, which are arranged on the first side 11 of the intermediate element 7 and can be supplied with an electric current via the first contact element 8. Via the brushes 10 arranged on the second side 12, which are contacted via the contact element 7, current can be discharged according to a further ring contact arranged offset axially along the shaft 6. A reverse current flow is also possible. In this way, for example, a current can be applied to an exciter coil arrangement arranged on the rotating shaft.

The receptacle 13 extending between the opposite sides 11, 12 of the intermediate element 7 is designed here as a circular through hole. The intermediate element 7 and the contact elements 8, 9 are each in the form of an annular disk, so that the brush holder 3 can be used to arrange the brushes around the circumference of a rotating shaft 6. Due to the fact that the receptacle 13 is designed as a through hole, the intermediate element completely surrounds the shaft 6 in a plane orthogonal to the axis of rotation 43 of the shaft 6 or orthogonal to the axial extension of the shaft 6. Alternatively, it is possible for the receptacle 13 to be designed as a notch in the intermediate element 7, so that the intermediate element 7 and/or the contact elements 8, 9 each have, for example, a horseshoe shape or a C shape. This also enables the brushes 10 to be arranged around the circumference of the rotating shaft 6.

The contact elements 8, 9 each delimit a plurality of receiving sections 14 with the intermediate element 7, in which the brushes 10 are received. The receiving sections 14 are each formed by a bracket-shaped section 15 of the contact elements 8, 9. Between the bracket-shaped sections 15 and the intermediate element 7 receiving sections 14 are formed, which have a substantially rectangular cross-section. The brushes 10 are arranged in these receiving sections 14.

The brushes 10 are connected to the contact elements 8, 9 via connecting means 16. The connecting means 16 can be designed, for example, as cables, clamps, brackets or the like and connect the brushes 10 electrically to the contact elements 8, 9. The contact elements 8, 9 also each have a contact section 17, 18 for electrical contacting, which protrudes outwards from the intermediate element 7 in the radial direction of the through opening 13 or of the shaft 6.

The contact sections 17, 18 each have at least one opening 19 in which a conductive pin 20 is inserted. The contact elements 8, 9 can be electrically contacted via the conductive pin 20 and the contact sections 17, 18 and can be connected to an electrical circuit for generating an excitation current of an electrical machine 2, for example via at least one electrical line in each case. Inserting the pins 20 into the openings 19 makes it possible for the contact elements 8, 9 to be manufactured as identical parts with an identical geometry. By using identical parts for the contact elements 8, 9, the production costs for the brush holder 8 are reduced.

The brush holder 3 also comprises a plurality of pressing means 21, via which a force can be applied to the brushes 10 arranged on the brush holder. The force is directed in the direction of a center of a shaft 6 arranged in the receptacle 13. The pressing means 21 are designed as spiral springs and are each arranged on a pin-shaped projection 22 of the contact elements 8, 9. The pressing means 21 are each arranged in a receiving section 23 of the intermediate element 7, the outer circumference of the spiral springs being surrounded by a circular segment-shaped projection 24 of the intermediate element 7, which protrudes from the side 11 in the axial direction of the shaft 6. In this way, the pressing means 21 are held stably on the brush holder 3.

The intermediate element 7 also comprises three attachment sections 25 each of which has an opening 26. For example, an attachment means 27 such as a screw can be guided through the opening 26 in order to attach the brush holder 3 to or in an electrical machine 2. The attachment sections 25 are each formed by projections 48 which protrude from the first side 11 and from the second side 12 of the intermediate element 7. The projections 48 are each designed either separately or in one piece with the projections 24 delimiting the receiving sections 23.

Figure 3:
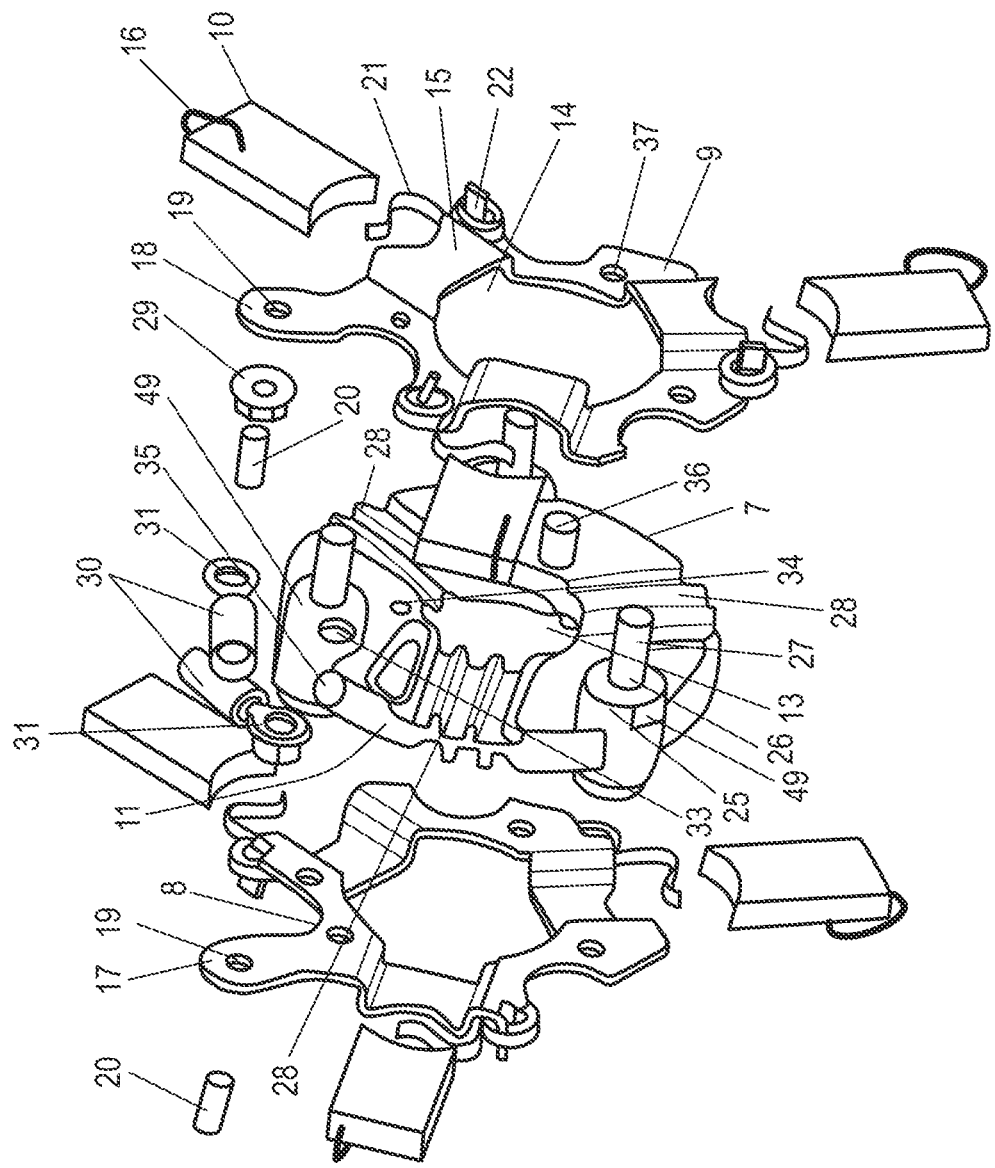
FIG. 3 shows an exploded depiction of the first embodiment of the brush holder.

FIG. 3 depicts an exploded depiction of the brush holder 3. Compared to the depiction in FIG. 2, the brush holder 3 is rotated so that the second side 12 of the intermediate element 7 can be viewed. As can be seen, the intermediate element 7 has a plurality of rib structures 28 on both the first side 11 and the second side 12, which each extend in the areas of the intermediate element 7, which, together with the arcuate sections 15 of the contact elements 8, 9 each delimit the receiving areas 14. Rib-shaped structures 28 reduce the contact surface between the brushes 10 and the intermediate element 7, so that the pressing of the brushes 10 onto the shaft 6 is made easier. Furthermore, the rib-shaped structures 28 enable a liquid and/or gaseous coolant to flow through the receiving sections 14.

The attachment means 27, which are arranged in the openings 26, are also depicted. The pins engaging in the openings 19 can, for example, each have a thread for attaching nuts 29 and are used to connect one or more cables 30, which can be attached to the pins 20 via cable lugs 31, for example.

The intermediate element 7 also comprises a cooling duct 32 which runs in its interior and has an inlet opening 33 and a plurality of outlet openings 34, 35. The cooling duct 32 is used to apply a coolant to the brushes 10 and/or the counterparts of the brushes 10 in the sliding contact arrangement, as will be described in more detail below.

The intermediate element 7 has a plurality of pins 36 protruding from the sides 11, 12, which each extend through a corresponding through hole 37 in the adjacent contact elements 8 and 9, respectively. After the contact elements 8, 9 have been arranged, the contact elements 8, 9 can be attached to the intermediate element 7 by reshaping the pins 36, in particular by widening the sections of the pins 36 protruding beyond the through holes 37. Furthermore, one side of the intermediate element 7, in this case the second side 12, can have one or more notches 49 in order to specify the mounting direction of the brush holder 3 on an electrical machine 2. The notches 49 can be formed in the projections 48 on the second side 12, for example.

Figure 4:
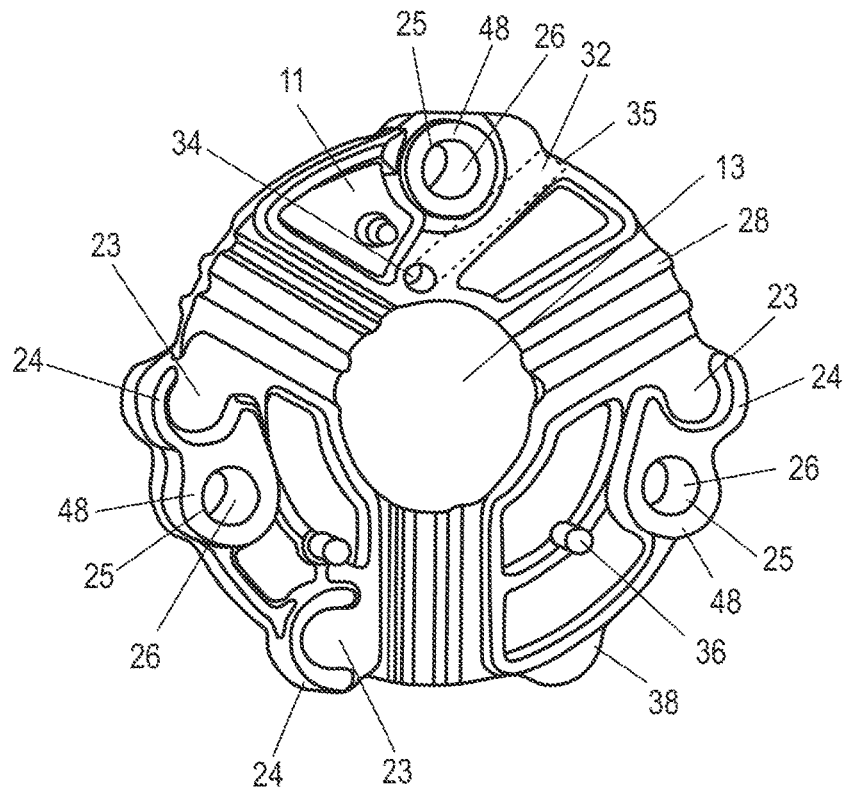
FIG. 4 shows a detailed view of the intermediate element of the first embodiment of the brush holder.

FIG. 4 shows a top view of the first side 11 of the intermediate element 7. The course of the cooling duct 32 inside the intermediate element 7 is depicted schematically. The cooling duct 32 has a cone shape, with the broader end of the cone being located on the outer circumference of the intermediate element 7 and forming the outlet opening 35. The narrower end of the cone shape opens into the outlet openings 34, which are respectively arranged on the sides 11 and 12 of the intermediate element 7 in the immediate vicinity of the contact areas of the brushes 10 with the contact rings of a rotating shaft 6.

The outlet openings 34 are designed here as drip openings, so that a liquid coolant that is supplied to the cooling duct 32 can drip off the intermediate element 7 and thus can reach the contact area of the brushes 10 with their counterparts of the sliding contact arrangement. In this way, cooling of the sliding contact arrangement can be achieved since the oil dripping from the rotating shaft 6, for example, dissipates heat therefrom. With the exception of the inlet opening 33, which is depicted in FIG. 3, the structure of the first side 11 of the intermediate element 7 corresponds to the structure of the second side 12, so that identically designed contact elements 8, 9 can be used.

In the present case, the intermediate element 7 has three pins 36 per side for attachment. It also comprises three contact sections 25 and three receiving sections 23 for holding the pressing means 22. Two of the receiving sections 23 are formed in pairs with an attachment section 25 by a common projecting structure which forms the projections 24 and 48 in one piece. The third receiving section 23 and the third attachment section 25 are formed by separate projections 24 and 48 projecting from the first surface and the second surface 12, respectively. As can be seen, a further rib structure 38 also extends in the areas below the contact elements 8, 9 in order to enable the contact elements 8, 9 to abut flat and/or without tension on the intermediate element 7.

Figure 5:
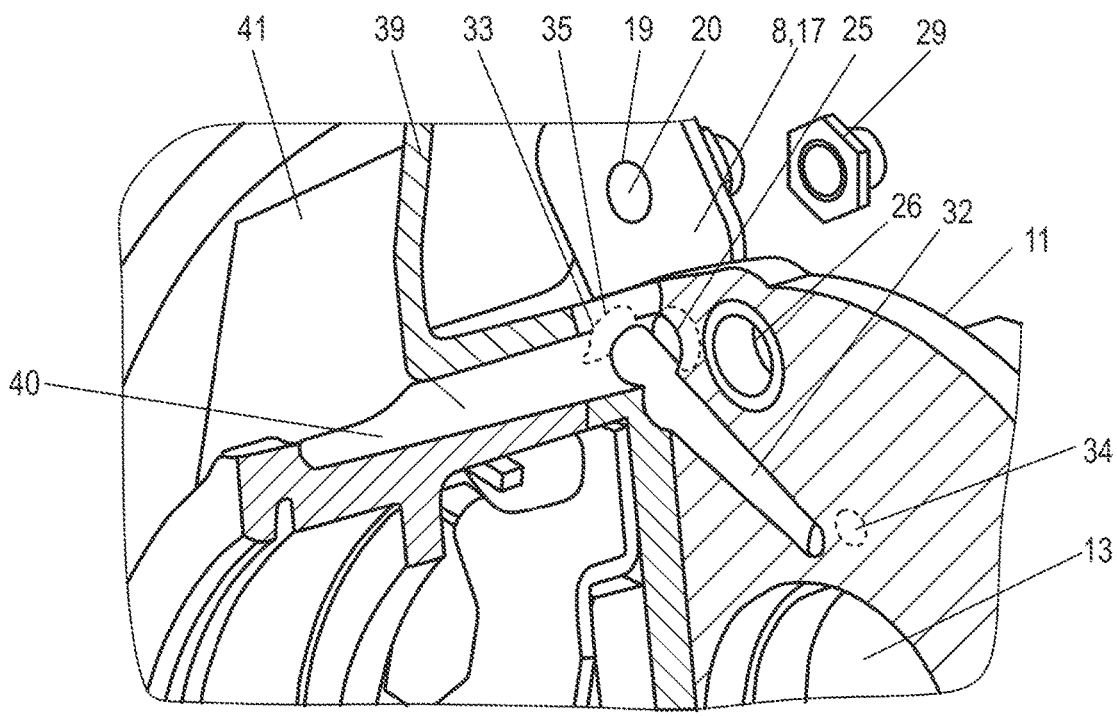
FIG. 5 shows a first embodiment of an electrical machine, comprising the first embodiment of the brush holder.

An embodiment of an electrical machine 2 is shown in FIG. 5. The electrical machine 2 comprises the previously described embodiment of the brush holder 3. The brush holder 3 is depicted partially in section here, so that the view of the cooling duct 32 extending inside the intermediate element 7 is made possible.

The brush holder 3 is arranged in a wet space of the electrical machine 2 that is at least partially filled with an electrically insulating coolant. The first side 11 of the intermediate element 7 of the brush holder abuts in some areas on a housing component 39 of the electrical machine 2 designed as bearing plate, which serves in particular to support the rotating shaft 6 (not shown here) inside a housing of the electrical machine 2.

A cooling liquid can be supplied to the cooling duct 32 of the intermediate element 7 via a cooling duct 40 which runs within the housing component 39. The cooling liquid can in particular be an electrically insulating cooling oil which is used to cool a rotor and/or a stator of the electrical machine 2. In the depiction in FIG. 5 the rotor is on the left side and thus on the side of the housing component 39 opposite the brush holder 3. The housing component 39 is thus arranged between the rotor of the electrical machine 2 and the brush holder 3.

The coolant can be supplied to the cooling duct 40 of the housing component 39 via at least one guide structure 41. The guide structure 41, which is designed as a baffle plate, for example, can catch cooling oil hurled up inside the electrical machine 2 during the rotation of the rotor, with the cooling oil being able to flow off the guide structure 41 in accordance with the arrows shown, so that it is supplied to the cooling duct 40.

Figure 6:
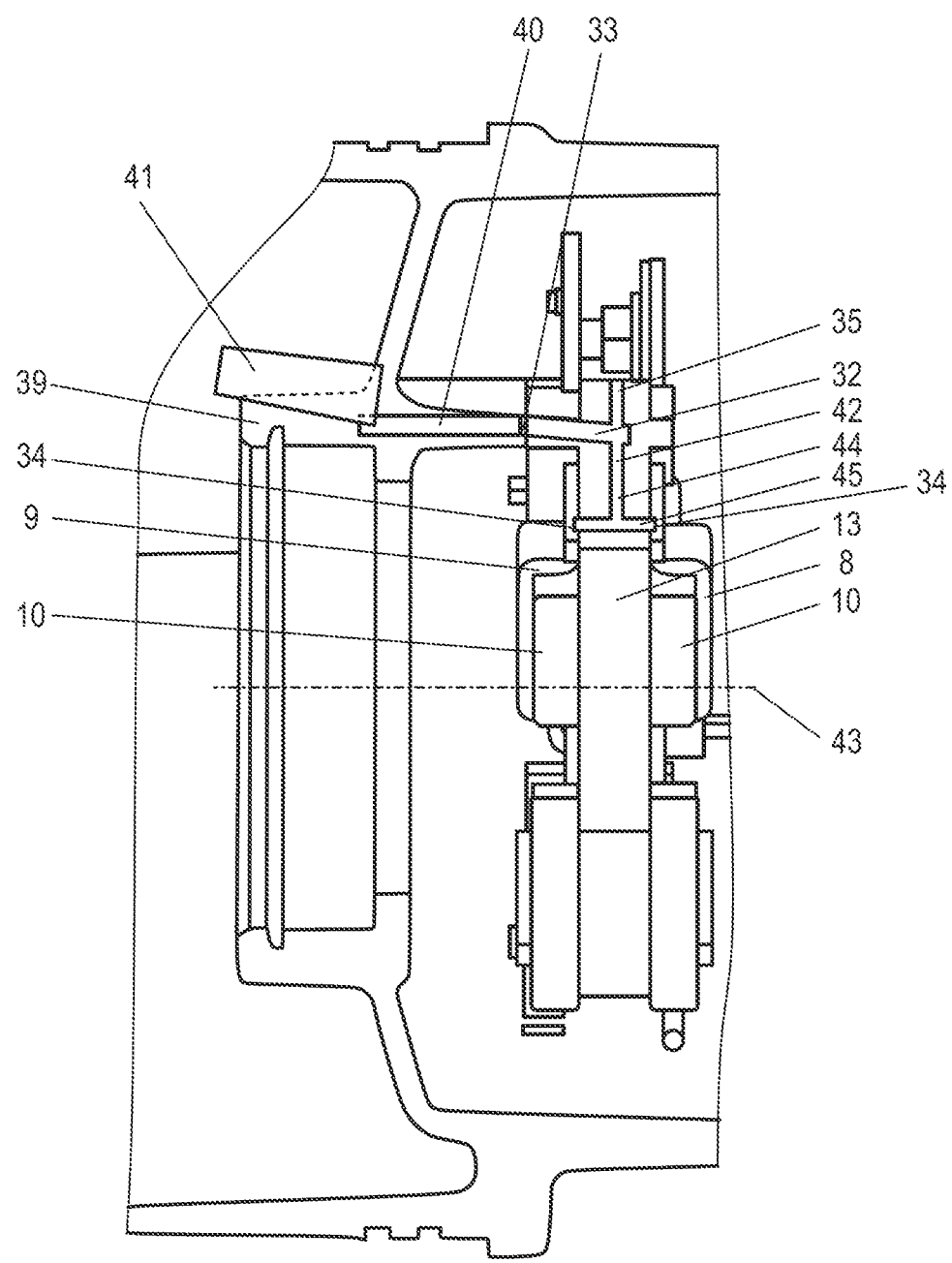
FIG. 6 shows a sectional view of the first embodiment of the electrical machine.

A sectional view of the first embodiment of the electrical machine 2 is depicted in FIG. 6. As can be seen, the cooling duct 40 is directly connected to the guide structure 41. The cooling liquid can be supplied to the cooling duct 32 via the cooling duct 40 in the interior of the intermediate element 7 of the brush holder 3 via the inlet opening 33. The cooling duct 32 comprises a first section 42 which extends at least substantially parallel to the axis of rotation 43 of the rotating shaft 6. The section 42 opens into a further section 44 which extends in the radial direction to the axis of rotation 43. In the area of the receptacle 13, the further section 44 opens into a further axial section 45, via which the cooling liquid can be supplied to the outlet openings 34 on the opposite sides 11, 12 of the intermediate element 7. The coolant is supplied to the sliding contact arrangement via the outlet openings 34, from where it then flows, for example, into a coolant sump. The coolant can then be supplied back to the rotor of the electrical machine 2 from the coolant sump. The outlet opening 35 is used, for example, to vent the cooling duct 32.

Figure 7:
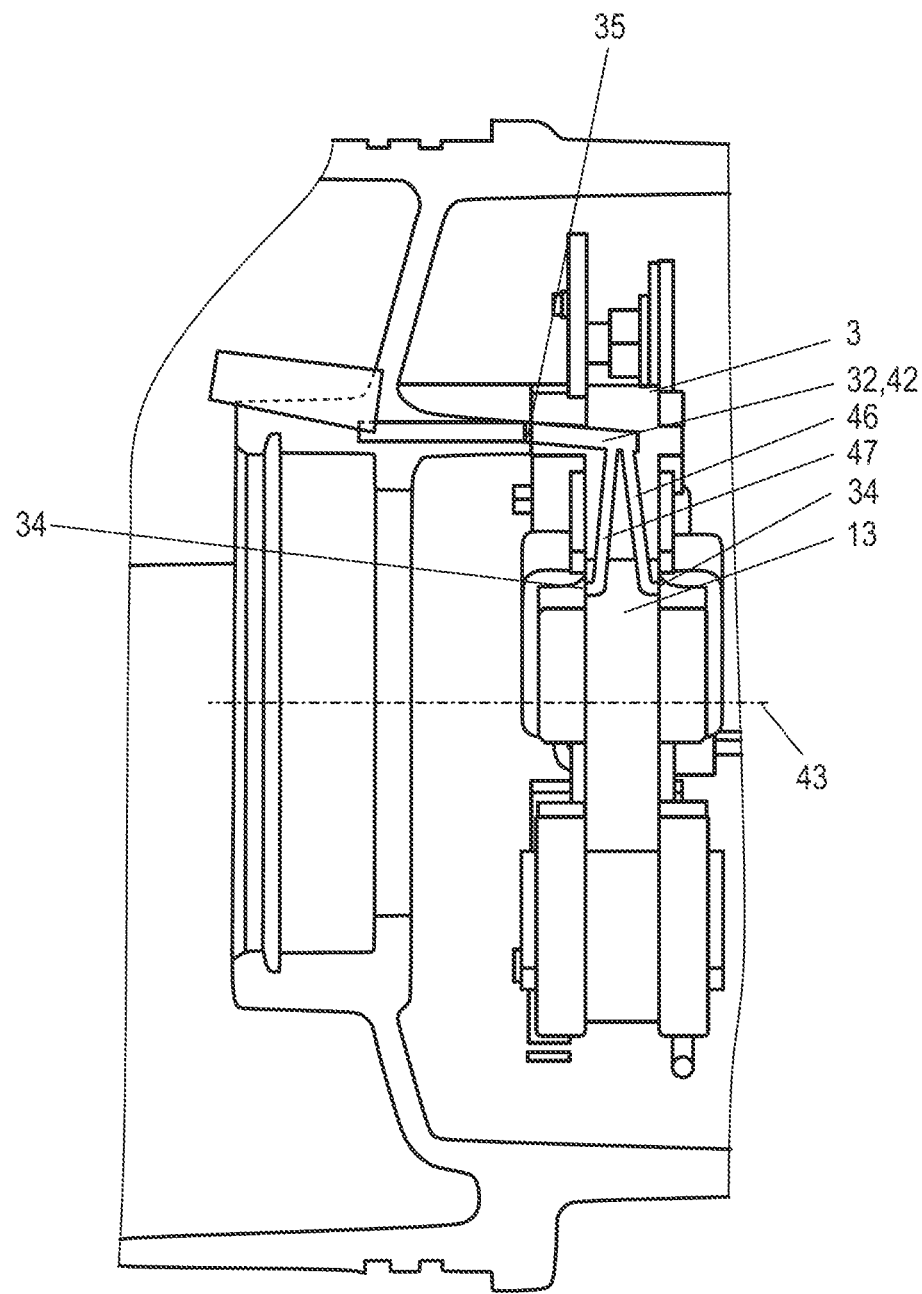
FIG. 7 shows a sectional view of a second embodiment of an electrical machine, comprising a second embodiment of a brush holder.

A second embodiment of the electrical machine 2 is depicted in FIG. 7. The second embodiment comprises a second embodiment of a brush holder 3. The second embodiment of the brush holder 3 differs from the first embodiment of the brush holder 3 in the course of the cooling duct 32 inside the intermediate element 7. The machine-side coolant supply via the guide structure 41 and the cooling duct 40 of the housing component 39 takes place in a manner analogous to the first embodiment of the electrical machine 2. The section 42 of the cooling duct 32 adjoins the inlet opening 33 on the second side 12 of the intermediate element 7. It opens centrally in the interior of the intermediate element 7 in two sections 46, 47, which each run obliquely to the radial direction and end in the area of the receptacle 13 at the outlet openings 34 in each case.

In addition to a design of the outlet openings 34 as drip openings, a design of the outlet openings 34 as nozzles is also possible. In this case, the coolant can be supplied to the cooling duct 32 inside the intermediate element 7 under pressure, so that the brushes 10 and/or the contact areas between the brushes and their counterparts in the sliding contact arrangement can be sprayed with the coolant from the outlet openings 34 designed as nozzles.

German patent application no. 10 2021 122065.3, filed Aug. 26, 2021, to which this application claims priority, is hereby incorporated herein by reference, in its entirety. Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A brush holder for holding at least two brushes for a sliding contact arrangement, comprising:
an intermediate element and two contact elements, a first one of the contact elements being arranged on a first side of the intermediate element for electrically contacting at least a first one of the brushes, a second one of the contact elements being arranged on a second side of the intermediate element for electrically contacting at least a second one of the brushes, the contact elements thus being arranged on two opposite sides of the intermediate element, the intermediate element having a receptacle extending through the opposite sides for a rotating shaft, and the intermediate element and contact elements being configured to support the first one of the brushes and the second one of the brushes spaced apart in an axial direction of the rotating shaft.

2. The brush holder according to claim 1, wherein the receptacle is designed as a through hole or a recess of the intermediate element.

3. The brush holder according to claim 1, wherein the intermediate element and/or the contact elements are in the form of annular disks.

4. The brush holder according to claim 1, wherein the contact elements each delimit with the intermediate element at least one receiving section for receiving one of the brushes.

5. The brush holder according to claim 4, wherein the areas of the sides of the intermediate element delimiting the receiving sections each have a rib structure.

6. The brush holder according to claim 1, wherein the brush holder comprises at least one pressing means, wherein, via the pressing means, a force can be applied to a brush arranged on the brush holder.

7. A brush holder for holding at least two brushes for a sliding contact arrangement, comprising:
an intermediate element and two contact elements for electrically contacting at least one of the brushes, the contact elements being arranged on two opposite sides of the intermediate element and the intermediate element having a receptacle extending through the opposite sides for a rotating shaft, and wherein the contact elements each have at least one contact section which protrudes laterally beyond the intermediate element.

8. A brush holder for holding at least two brushes for a sliding contact arrangement, comprising:
an intermediate element and two contact elements for electrically contacting at least one of the brushes, the contact elements being arranged on two opposite sides of the intermediate element and the intermediate element having a receptacle extending through the opposite sides for a rotating shaft, and wherein the contact elements have an identical geometry.

9. A brush holder for holding at least two brushes for a sliding contact arrangement, comprising:
an intermediate element and two contact elements for electrically contacting at least one of the brushes, the contact elements being arranged on two opposite sides of the intermediate element and the intermediate element having a receptacle extending through the opposite sides for a rotating shaft, and wherein the intermediate element has at least one cooling duct extending inside the intermediate element.

10. The brush holder according to claim 9, wherein the intermediate element has at least one outlet opening of the cooling duct on at least one of the opposite sides.

11. The brush holder according to claim 9, wherein the outlet opening is designed as a drip opening or as a nozzle.

12. A brush holder for holding at least two brushes for a sliding contact arrangement, comprising:
an intermediate element and two contact elements for electrically contacting at least one of the brushes, the contact elements being arranged on two opposite sides of the intermediate element and the intermediate element having a receptacle extending through the opposite sides for a rotating shaft, and wherein the intermediate element has on the opposite sides in each case at least one pin protruding from the respective side which extends through a corresponding through hole in the adjacent contact element, the contact elements each being attached to the intermediate element by reshaping the pin.

13. An electrical machine comprising at least one brush holder for holding at least two brushes for a sliding contact arrangement, the brush holder comprising:
An intermediate element and two contact elements, a first one of the contact elements being arranged on a first side of the intermediate element for electrically contacting at least a first one of the brushes, a second one of the contact elements being arranged on a second side of the intermediate element for electrically contacting at least a second one of the brushes, the contact elements thus being arranged on two opposite sides of the intermediate element, the intermediate element having a receptacle extending through the opposite sides for a rotating shaft and the intermediate element and contact elements being configured to support the first one of the brushes and the second one of the brushes spaced apart in an axial direction of the rotating shaft.

14. An electrical machine comprising at least one brush holder for holding at least two brushes for a sliding contact arrangement, the brush holder comprising:
an intermediate element and two contact elements for electrically contacting at least one of the brushes, the contact elements being arranged on two opposite sides of the intermediate element and the intermediate element having a receptacle extending through the opposite sides for a rotating shaft, and wherein the brush holder is arranged in a wet space of the electrical machine which is at least partially filled with an insulating coolant.

15. An electrical machine comprising at least one brush holder for holding at least two brushes for a sliding contact arrangement, the brush holder comprising:
an intermediate element and two contact elements for electrically contacting at least one of the brushes, the contact elements being arranged on two opposite sides of the intermediate element and the intermediate element having a receptacle extending through the opposite sides for a rotating shaft, and wherein the intermediate element of the brush holder has at least one cooling duct extending inside the intermediate element, the intermediate element abutting on a housing component of the electrical machine, and a coolant can be supplied to the cooling duct via a cooling duct of the housing component.

16. The electrical machine according to claim 15, wherein the housing component is arranged between a rotor of the electrical machine and the brush holder, wherein cooling liquid can be supplied to the cooling duct of the housing component as coolant via at least one guide structure.

17. A motor vehicle comprising at least one electrical machine including at least one brush holder for holding at least two brushes for a sliding contact arrangement, the brush holder comprising:
   an intermediate element and two contact elements, a first one of the contact elements being arranged on a first side of the intermediate element for electrically contacting at least a first one of the brushes, a second one of the contact elements being arranged on a second side of the intermediate element for electrically contacting at least a second one of the brushes, the contact elements thus being arranged on two opposite sides of the intermediate element, the intermediate element having a receptacle extending through the opposite sides for a rotating shaft, and the intermediate element and contact elements being configured to support the first one of the brushes and the second one of the brushes spaced apart in an axial direction of the rotating shaft.

* * * * *